A. E. WALDEN.
STERILIZER.
APPLICATION FILED MAY 14, 1913.

1,085,955.

Patented Feb. 3, 1914.

WITNESSES:
Charles E. Keyser.
Charles E. Garitee

INVENTOR.
Albert E. Walden
BY
Chafin A. Ferguson
ATTORNEY.

UNITED STATES PATENT OFFICE.

ALBERT E. WALDEN, OF BALTIMORE, MARYLAND.

STERILIZER.

1,085,955.

Specification of Letters Patent.

Patented Feb. 3, 1914.

Application filed May 14, 1913. Serial No. 767,514.

*To all whom it may concern:*

Be it known that I, ALBERT E. WALDEN, a citizen of the United States, residing at Baltimore, in the State of Maryland, have invented certain new and useful Improvements in Sterilizers, of which the following is a specification.

This invention relates to improvements in sterilizers, and has for its object to provide a device for sterilizing water, sewage or other fluids, by means of ozone, air or other gas at atmospheric pressure.

The invention consists of the novel construction and arrangement of the parts and combination of parts hereinafter more fully set forth in the following specification and pointed out in detail in the appended claims.

Figure 1:
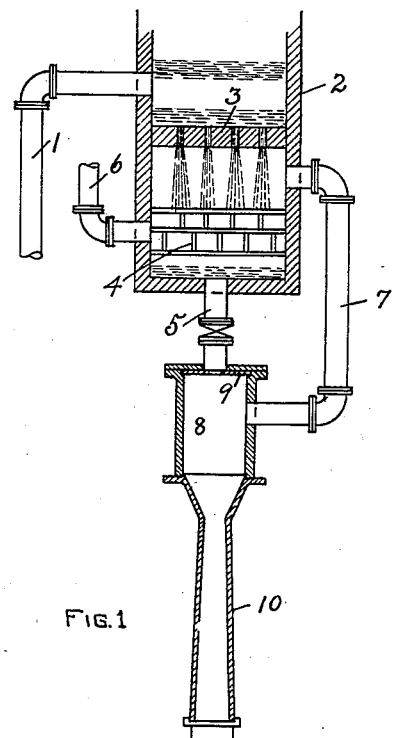
Figure 3:
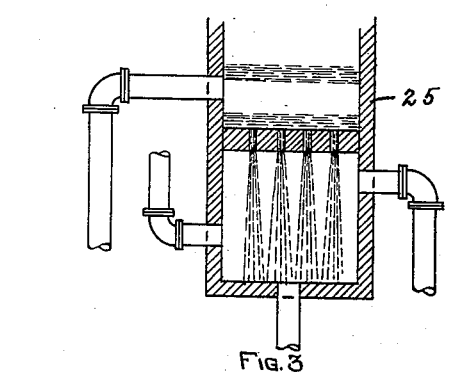
Figure 2:
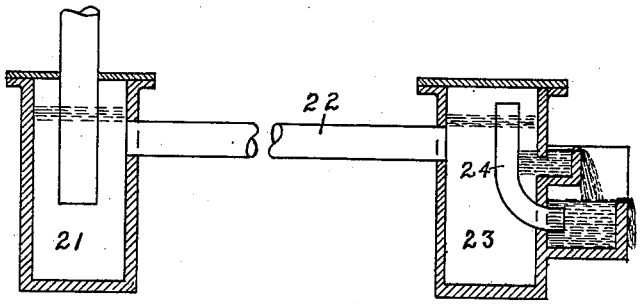
Figure 4:
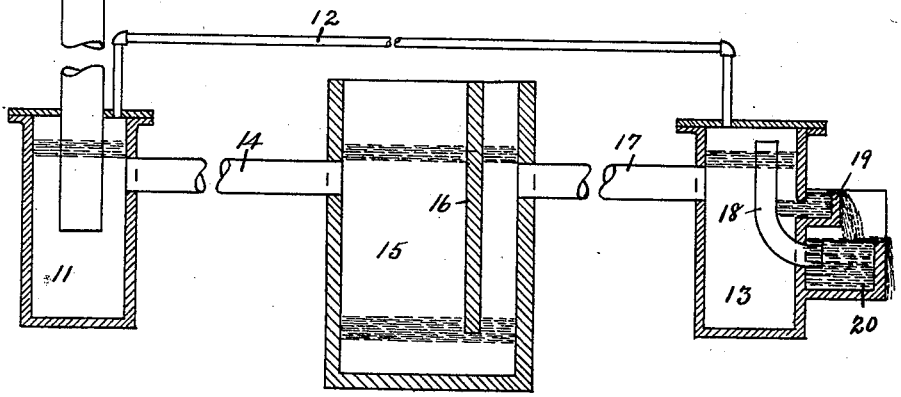
Figure 4:
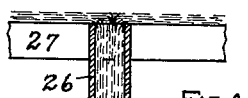

In the accompanying drawings, Figure 1 is a vertical sectional view of my invention. Fig. 2 is a modification of the mixing wells. Fig. 3 is a modification of the supply tank. Fig. 4 is a modification of the sprayer for the supply tank.

Referring to the accompanying drawings, forming part of this specification, and in which like reference numerals designate like parts throughout the several views thereof, 1 designates a pipe through which the water, sewage, or other fluid to be sterilized, is pumped or forced to the supply tank 2, the said water, sewage or other liquid flowing through the perforated partition wall, or sprayer, 3 down through the checker work 4 in the bottom of the tank 2, and through the pipe 5 to the aspirator. The depth of the water, or other liquid, in the supply tank 2 may be controlled automatically or non-automatically, as desired. The water, sewage or other liquid passing through the bottom of the tank 2 to the pipe 5 and aspirator chamber 8 sucks, or draws, the ozone, air, or other gas, through the pipe 6 causing it to mix with the water, sewage, or other liquid, as it passes to the aspirator. The air, ozone or other gas, which escapes from the water in the lower part of the tank 2 passes off through the pipe 7 to the mixing chamber 8 of the aspirator. The water, sewage, or other liquid flows from the bottom of the tank 2 through the pipe 5 and through the disk-shaped nozzle 9 into the mixing chamber 8 thereby aspirating, or sucking in the ozone or other suitable gas through the pipe 7 from said tank 2. The walls of the aspirator below the chamber 8 converge then diverge and terminate in a straight lower end projecting into the mixing and washing well 11. The water passing from the mixing chamber 8 is given the necessary velocity to overcome the known tendency of an air or gas bubble to rise in the aspirator, and is further mixed with the ozone or other gas as it passes through the pipe 10 of the aspirator to the mixing and washing well 11, in which latter a certain reduction of velocity and breaking up of the mixture takes place, a portion of the ozone, or other gas, rising more rapidly to the top of said well, thereby washing the liquid with the ozone, or other gas, as it passes through the said water, the gas then passes through the pipe 12 to the secondary mixing well 13. The water, sewage, or other liquid flows from the mixing well 11 through the pipe 14 to the flotation and stilling tank 15, which latter is provided with a baffle wall 16 extending the entire length of the said tank and projecting from the top to near the bottom thereof. As the water, sewage, or other liquid flows into the tank 15 the algæ or bacteria arises to the surface where it may be removed in any suitable manner. The clear water flows under the baffle wall 16 to the opposite side thereof and out through the pipe 17 to the secondary mixing well 13 where the water is again reduced in velocity and the ozone or other gas thus given up, or portions of the same, allowed to arise to the top of the well 13 and mix with the gas which comes into said well 13 through the pipe 12. The pressure of the ozone, or other gas, which collects in the top of the well 13 forces the said gas down through the pipe 18 and up through the seal caused by the overflow of the water from the weir 19 to the weir 20, the ozone or other gas being reduced to a minimum, thereby thoroughly mixing and washing the liquid to be sterilized and reducing the amount of ozone, or other gas, that would otherwise escape, to a minimum.

In Fig. 2 I have shown a modification in which the subsidence tank is omitted. In this modification the water passes from the first mixing well 21 through the pipe 22 to the secondary mixing well 23. The ozone, or other gas, which arises and collects in the top of the first mixing well 21 is forced by its own pressure through the pipe 22, where it mixes with the water, sewage or other liquid passing through said pipe. As the water, sewage or other liquid flows into the secondary mixing well 23 the ozone or other gas collects in the top of the said well and is forced by its own pressure down through the pipe 24 and passes up through the water flowing over the weirs, as described in Fig. 1.

In Fig. 3 I have shown a modification of the supply tank 25. In this modification the perforated partition wall, and the air and water in and outlet pipes are the same as in Fig. 1, but the checker work shown in Fig. 1 is omitted.

Fig. 4 is a modification of the spraying device for the supply tank. In this modification a pipe 26 is set in the partition wall 27 and has connected to its lower end a concaved sprayer 28. The water flows through the pipe 26 and into the sprayer 28, some of the said water flows over the side and some through the apertures in said sprayer.

Alterations in the construction and arrangement of the parts hereinbefore shown and described, may be made, within the scope of the appended claims, without departing from the spirit of my present invention.

Having thus described my invention, what I claim is:

1. In a sterilizer, the combination of a supply tank having an inlet and an outlet for the water, a perforated partition between the water inlet and outlet, an air or gas inlet pipe communicating with the supply tank below said partition, an aspirator, a pipe leading from the water outlet of the supply tank to the aspirator, and an air or gas pipe connecting the supply tank below the said partition with the aspirator.

2. In a sterilizer, the combination of a supply tank having an inlet and an outlet for the water, a sprayer between the said inlet and outlet, an aspirator having a mixing chamber, a pipe connecting the water outlet of the supply tank with the said mixing chamber, an air or gas inlet pipe leading into the supply tank below the sprayer, and an air or gas pipe connecting the supply tank below the sprayer with the mixing chamber of the aspirator.

3. In a sterilizer, the combination of a supply tank having an inlet and an outlet for the water, a sprayer between said inlet and outlet, an air or gas inlet pipe communicating with the supply tank below the said sprayer, an aspirator having a mixing chamber, a pipe connecting the water outlet of the supply tank with the mixing chamber of the aspirator, an air or gas pipe connecting the supply tank below the sprayer with the mixing chamber of the aspirator, a mixing well into which the lower end of the aspirator projects, a secondary mixing well having one or more weirs, and a pipe connecting the said two mixing wells.

4. In a sterilizer, the combination of a supply tank having an inlet and an outlet for the water, a sprayer between the said inlet and outlet, an aspirator, a pipe connecting the water outlet of the supply tank with the aspirator, an air or gas pipe leading into the supply tank below the sprayer, an air or gas pipe connecting the supply tank below the sprayer with the aspirator, a mixing well into which the lower end of the aspirator projects, a stilling and flotation tank, and a pipe connecting the mixing well with the stilling and flotation tank.

5. In a sterilizer, the combination of a supply tank having an inlet and an outlet for the water, a sprayer between the said inlet and outlet, an aspirator, a pipe connecting the water outlet of the supply tank with the aspirator, an air or gas pipe leading into the supply tank below the sprayer, an air or gas pipe connecting the supply tank below the sprayer with the aspirator, a mixing well into which the lower end of the aspirator projects, a secondary mixing well, a stilling and flotation tank, a pipe connecting the first mixing well with the stilling and flotation tank, and a pipe connecting the stilling and flotation tank with the secondary mixing well.

6. In a sterilizer, the combination of a supply tank having an inlet and outlet for the water, a sprayer between the said inlet and outlet, an aspirator, a pipe connecting the water outlet of the supply tank with the aspirator, an air or gas pipe leading into the supply tank below the sprayer, an air or gas pipe connecting the supply tank below the sprayer with the aspirator, a mixing well into which the lower end of the aspirator projects, a stilling and flotation tank having a baffle wall therein extending down to near the bottom thereof, and a pipe connecting the mixing well with the stilling and flotation tank.

In testimony whereof I affix my signature in presence of two witnesses.

ALBERT E. WALDEN.

Witnesses:
CHAPIN A. FERGUSON,
EMMA BELL.

---

Copies of this patent may be obtained for five cents each, by addressing the "Commissioner of Patents, Washington, D. C."